United States Patent
Algüera Gallego et al.

(10) Patent No.: US 10,300,961 B2
(45) Date of Patent: May 28, 2019

(54) VEHICLE COUPLING

(75) Inventors: José Manuel Algüera Gallego, Aschaffenburg (DE); Jens Polte, Greenville, TX (US)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 530 days.

(21) Appl. No.: 12/864,131

(22) PCT Filed: Jan. 22, 2009

(86) PCT No.: PCT/EP2009/050702
§ 371 (c)(1),
(2), (4) Date: Sep. 29, 2010

(87) PCT Pub. No.: WO2009/092756
PCT Pub. Date: Jul. 30, 2009

(65) Prior Publication Data
US 2011/0044755 A1 Feb. 24, 2011

(30) Foreign Application Priority Data

Jan. 26, 2008 (DE) .................... 10 2008 006 204

(51) Int. Cl.
*B62D 53/08* (2006.01)
*B62D 29/00* (2006.01)

(52) U.S. Cl.
CPC ......... *B62D 29/001* (2013.01); *B62D 29/004* (2013.01); *B62D 53/08* (2013.01); *B62D 53/0885* (2013.01); *Y10T 403/74* (2015.01)

(58) Field of Classification Search
CPC .... B60D 1/015; B62D 53/08; B62D 53/0885; B62D 29/002; B62D 29/004; B62D 29/001; Y10T 403/74

USPC .......... 403/265, 268, 69, 269; 280/433; 384/421; 464/89, 135, 181, 183
See application file for complete search history.

(56) References Cited

U.S. PATENT DOCUMENTS

| | | | | |
|---|---|---|---|---|
| 1,955,965 A | * | 4/1934 | Ketel et al. | 280/440 |
| 1,968,573 A | * | 7/1934 | Seyferth | 280/440 |
| 3,003,810 A | * | 10/1961 | Kloote et al. | 296/181.3 |
| 3,630,545 A | * | 12/1971 | Fontaine et al. | 280/434 |
| 3,704,924 A | * | 12/1972 | Lowry | 384/421 |
| 3,742,656 A | * | 7/1973 | Amos | 451/508 |
| 3,775,922 A | * | 12/1973 | Myers | 52/367 |
| 3,859,821 A | * | 1/1975 | Wallace | 464/89 |

(Continued)

FOREIGN PATENT DOCUMENTS

| | | |
|---|---|---|
| CN | 2242834 Y | 12/1996 |
| CN | 1329983 A | 1/2002 |

(Continued)

OTHER PUBLICATIONS

International Search Report and Written Opinion, dated Apr. 24, 2009, pp. 1-7, International Patent Application No. PCT/EP2009/050702, European Patent Office, The Netherlands.

(Continued)

*Primary Examiner* — Matthew R McMahon
(74) *Attorney, Agent, or Firm* — Brinks Gilson & Lione

(57) ABSTRACT

A vehicle coupling, and a method for the manufacture thereof, having a coupling body (1) and at least one structural element (2) placed thereon wherein the structural element (2) is force fit to the coupling body (1) using a bulk plastic material (3).

14 Claims, 5 Drawing Sheets

(56) References Cited

U.S. PATENT DOCUMENTS

| | | | | |
|---|---|---|---|---|
| 3,924,909 | A * | 12/1975 | Kent et al. | 384/421 |
| 4,188,888 | A * | 2/1980 | Cooper et al. | 105/199.4 |
| 4,451,245 | A * | 5/1984 | Hornig et al. | 464/181 |
| 4,585,133 | A * | 4/1986 | Cope | 213/206 |
| 4,752,081 | A * | 6/1988 | Reeners et al. | 280/433 |
| 4,801,159 | A * | 1/1989 | Sehorn | 285/55 |
| 4,853,270 | A * | 8/1989 | Wycech | 428/68 |
| 5,263,856 | A * | 11/1993 | Huehn et al. | 384/421 |
| 5,431,424 | A * | 7/1995 | Colwell | 280/433 |
| 5,522,613 | A * | 6/1996 | Heeb | 280/433 |
| 5,536,031 | A * | 7/1996 | Hurley | 280/507 |
| 5,620,770 | A | 4/1997 | Cork | 428/121 |
| 5,622,767 | A | 4/1997 | Cork | 428/121 |
| 5,746,438 | A * | 5/1998 | Bergmann et al. | 280/433 |
| 6,003,274 | A * | 12/1999 | Wycech | 52/232 |
| 6,058,673 | A | 5/2000 | Wycech | 52/721.4 |
| 6,096,403 | A * | 8/2000 | Wycech | 428/122 |
| 6,158,190 | A * | 12/2000 | Seng | 52/841 |
| 6,190,263 | B1 * | 2/2001 | Kimoto et al. | 464/181 |
| 6,199,889 | B1 * | 3/2001 | Golembiewski | B62D 53/08 |
| | | | | 280/433 |
| 6,327,827 | B1 * | 12/2001 | Flegel et al. | 52/309.13 |
| 6,382,635 | B1 * | 5/2002 | Fitzgerald | 277/630 |
| 6,419,305 | B1 * | 7/2002 | Larsen | 296/203.03 |
| 6,474,726 | B1 * | 11/2002 | Hanakawa et al. | 296/191 |
| 6,476,322 | B1 * | 11/2002 | Dunne et al. | 174/68.1 |
| 6,623,024 | B1 * | 9/2003 | Alguera Gallego et al. | |
| | | | | 280/433 |
| 6,635,175 | B2 * | 10/2003 | Stankowski | 210/232 |
| 6,729,425 | B2 * | 5/2004 | Schneider et al. | 180/68.5 |
| 6,837,365 | B1 * | 1/2005 | Forbin | 198/836.1 |
| 6,863,339 | B2 * | 3/2005 | Bohm et al. | 296/191 |
| 6,986,713 | B2 * | 1/2006 | Dine et al. | 464/181 |
| 7,213,379 | B2 * | 5/2007 | Carlson et al. | 52/837 |
| 7,530,589 | B1 * | 5/2009 | Mann | B62D 53/0814 |
| | | | | 280/433 |
| 7,547,034 | B2 * | 6/2009 | Hungerink et al. | 280/433 |
| 7,766,361 | B2 * | 8/2010 | Hungerink | B62D 53/0842 |
| | | | | 280/407 |
| 7,838,100 | B2 * | 11/2010 | McLeod et al. | 428/172 |
| 7,905,072 | B2 | 3/2011 | Verhaeghe | 52/783.1 |
| 7,931,291 | B2 * | 4/2011 | Mann | 280/434 |
| 8,087,916 | B2 * | 1/2012 | Kanie et al. | 425/4 R |
| 8,382,146 | B2 * | 2/2013 | Schmidt et al. | 280/433 |
| 2003/0047906 | A1 | 3/2003 | Hicks et al. | |
| 2003/0057737 | A1 | 3/2003 | Bock et al. | |
| 2003/0118806 | A1 * | 6/2003 | Schonebeck | 428/304.4 |
| 2006/0057333 | A1 * | 3/2006 | Brahim | 428/138 |
| 2006/0170191 | A1 | 8/2006 | Hungerink et al. | 280/433 |
| 2006/0249927 | A1 * | 11/2006 | Metternich et al. | 280/515 |
| 2009/0212533 | A1 | 8/2009 | Verhaeghe | 280/423.1 |
| 2011/0025019 | A1 | 2/2011 | Schmidt et al. | 280/504 |
| 2011/0140402 | A1 | 6/2011 | Lanting et al. | 280/763.1 |

FOREIGN PATENT DOCUMENTS

| | | | | |
|---|---|---|---|---|
| DE | 197 20 109 A1 | 11/1997 | | B62D 21/02 |
| DE | 19813635 A1 | 9/1999 | | |
| DE | 198 14 275 A1 | 10/1999 | | B62D 53/08 |
| DE | 10021232 A1 | 10/2001 | | |
| DE | 10029411 A1 | 12/2001 | | |
| DE | 102 60 531 A1 | 7/2004 | | B62D 65/00 |
| DE | 102006007129 A1 | 8/2007 | | |
| EP | 0 927 590 A2 | 7/1999 | | B62D 29/00 |
| EP | 1022164 A1 | 7/2000 | | |
| JP | 2001146163 | 5/2001 | | |
| WO | WO 2006/117395 A1 | 11/2006 | | B32B 5/20 |

OTHER PUBLICATIONS

International Search Report and Written Opinion, dated Apr. 29, 2009, pp. 1-9, International Patent Application No. PCT/EP2009/050701, European Patent Office, The Netherlands.

* cited by examiner

Prior Art

VEHICLE COUPLING

BACKGROUND

The invention relates to a vehicle coupling comprising a coupling body and at least one structural element arranged thereon, and a method for manufacturing a vehicle coupling.

The coupling body and the components interacting therewith are usually manufactured in a casting process from cast steel or nodular cast iron or are welded together from sheet metal parts. The resulting robust construction is necessary for the high operational forces to be expected so as to avoid deformations and to ensure a maximum wear protection. However, said previously used constructions have the disadvantage that the component weights and the operating expenses for processing, in particular performing the welding on sheet metal parts, are high.

Thus, the invention was based on the object to provide a vehicle coupling that is optimally dimensioned for the reduction of weight and cost in particular areas with respect to the expected mechanical load.

Another part of the object was to develop a corresponding manufacturing method for vehicle couplings.

SUMMARY

The object is solved according to the invention with a vehicle coupling for which the structural element is force fit to the coupling body by means of a bulk plastic material. The composite coupling produced in this manner has the advantage that the manufacturing costs are considerably reduced due to the minimal efforts for joining the individual parts. Moreover, the vehicle coupling according to the invention can be formed with complex geometries which otherwise can be implemented only with considerable additional expenses. This includes, for example, attaching holders for fastening additional components on the vehicle coupling.

Another advantage of the vehicle coupling according to the invention is the possibility to work, in mechanically low loaded areas, with thinner metal sheets and wall thicknesses as this is the case in the traditional construction. Known manufacturing methods need certain minimum wall thicknesses for welding or casting-related reasons, even if only low loads are to be expected.

Moreover, the vehicle coupling according to the invention has advantages in case of high dynamic loads, in particular in comparison to welding constructions in which the weld seams form a weak spot.

Preferably, the coupling body comprises a coupling plate of a fifth wheel coupling. As an alternative, the coupling body can be formed from a coupling jaw of a trailer coupling or bolt coupling. FIG. 9 shows one example of a convention coupling jaw, as described in U.S. Patent Application Pub. No. 2006/0249927 to Metternich et al., that includes a coupling jaw 20 with an opening 21 configured to receive a drawbar 22 (e.g., of a trailer) with a drawbar eye 23.

It was found to be advantageous if the coupling plate or coupling jaw is made of metal. In particular the upper side of the coupling plate of a fifth wheel coupling should have a metallic upper side. This is of advantage because of the high mechanical load of the upper side but also because of the visual appearance.

The structural element can preferably be formed from at least one reinforcement rib and/or holder and/or bearing point. A reinforcement rib is to be understood as a wall or stiffening structure for increasing the bending strength which is arranged in the assembled state of the fifth wheel coupling underneath the coupling plate. Holders on a vehicle coupling can be, for example, threaded insert parts. On a fifth wheel coupling, the bearing points are arranged on opposite lateral positions on bearing blocks arranged below the coupling plate for supporting the coupling plate. In particular reinforcement ribs and bearing points lie in the force flow of the operational forces.

Advantageously, a plurality of structural elements are provided on the vehicle coupling which are interconnected by means of a force-fit bulk plastic material. Thereby, a stabilizing framework structure can be obtained.

According to a particularly advantageous embodiment, the structural element is made of metal and/or carbon fiber and/or fiber glass. In consideration of the load expected in the respective area, the vehicle coupling according to the invention allows the use of different materials for the structural elements which lie within the force flow. By using carbon fiber elements and/or fiber glass elements, particularly significant reductions of the weight of the vehicle coupling can be achieved.

Particularly high strengths, in particular of the structural element, can be achieved with so-called metal foams. The metal foam is made from a foaming agent and a metal powder added thereto, wherein the metal powder consists in most cases of aluminum or steel. After foaming agent and metal powder are brought together and mixed, a first forming process and a subsequent foaming takes place. The foam structure results in very low volume density while the strength of the metal foam is only insignificantly reduced.

Advantageously, the structural element is in contact with the bulk plastic material with at least one side. This is achieved, for example, in that the structural element is completely or partially molded-in in the bulk plastic material or is foam-encapsulated by the same. A partially molded-in or foam-encapsulated structural element is visible with at least one side also in the assembled state. This has the advantage that a machinable and robust surface of the structural element is provided. Here, in particular in the area of the reinforcement ribs, a sandwich-like structure consisting of coupling element, bulk plastic material and structural element is obtained. A structural element that is completely molded-in in the bulk plastic material or is completely encapsulated in foam is not accessible from outside and provides a particularly effective corrosion protection.

Besides the structural element, also the vehicle coupling can be completely enclosed by the bulk plastic material. Provided that the vehicle coupling is a fifth wheel coupling, there is the possibility to manufacture a coupling plate which, for example at the contact points to the semitrailer or the bearing blocks, needs less or no lubricant.

A particularly high strength can be achieved if the bulk plastic material is fiber-reinforced.

Suitable as materials for the bulk plastic material are thermoplastics and thermosetting plastics. A thermoplastic resin deforms by heat and maintains its shape when cooling down. The best known thermoplastics are polypropylene, polyethylene, polyester, polyvinylchloride, and polyamide. Thermosetting plastics, also called duromers, are plastics which can not be deformed any more after their curing. Thermosetting plastics are hard, glass-like polymeric materials which are three-dimensionally cross-linked via chemical primary valence bonds. The cross-linking takes place during mixing of precursors with branch points and is either chemically activated at room temperature by means of catalysts or thermally activated at high temperatures.

In particular a plastic foam can be used as bulk plastic material. Also, the use of a metal foam as bulk plastic material is particularly suitable. The foaming agent of the metal foam comprises a plastic material, and in the present application, the term "metal foam" is understood in a broader sense as bulk plastic material.

The object is also solved by a manufacturing method in which the structural element is aligned on the coupling body according to its subsequent arrangement and is force-fit to the same by means of a bulk plastic material. Here, it was found to be advantageous to put the coupling body and the structural element in a molding tool. After curing of the bulk plastic material, the vehicle coupling formed from coupling body and structural element can be removed from the molding tool.

Advantageously, the coupling body comprises a coupling plate, onto which the structural elements are placed.

Preferably, the coupling plate according to the invention is placed on its side provided as upper side in the assembled state, and the at least one structural element is placed on its side provided as lower side in the assembled state. In this alignment, the structural elements can be fixed in their designated position in a particularly comfortable manner.

In a particularly advantageous method step, the structural element is completely or partially molded-in by the bulk plastic material.

BRIEF DESCRIPTION OF THE DRAWINGS

For a better understanding, the invention is illustrated hereinafter by means of a total of seven figures. In the figures.

DESCRIPTION OF PREFERRED EMBODIMENTS

Figure 1:
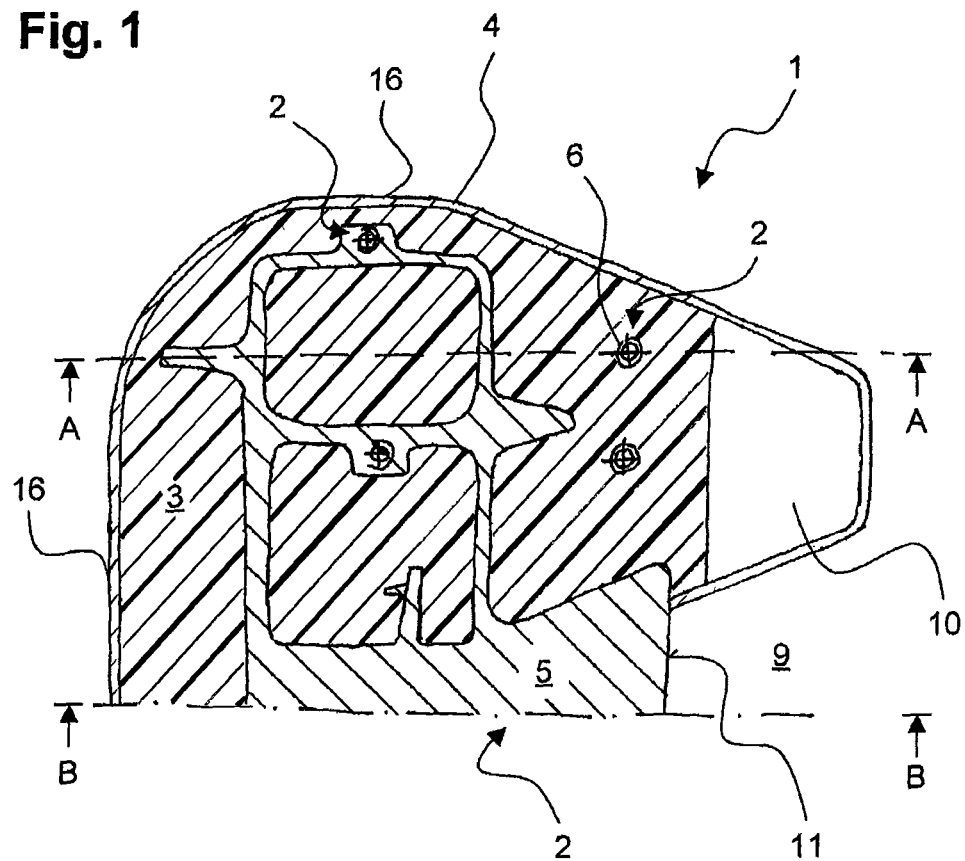
FIG. 1 shows a top view of a portion of the horizontally cut coupling plate according to a first embodiment.

FIG. 1 shows a top view on a horizontally cut coupling plate 4 as coupling body 1 of a fifth wheel coupling according to a first embodiment. On its rear side 11, the coupling plate 4 has an insertion opening 9 into which a non-shown king pin of a semitrailer can be inserted in a usual manner in the fifth wheel coupling. The insertion opening 9 is bordered on both sides by a coupling horn 10, wherein the illustration of FIG. 1 shows only the coupling horn 10 on the right side as viewed in driving direction.

In driving operation, the lower side of the semitrailer, which is not shown, is supported on the bearing area 12 (see FIG. 2) of the coupling plate 4. Thus, in this bearing area 12, considerable forces are transmitted into the coupling plate 4. To avoid dimensioning the entire coupling plate 4 with a large material thickness and a correspondingly high weight, a structural element 2 in the form of a reinforcement rib 5 is arranged on the lower side 8 (see FIG. 2) of the coupling plate 4.

The reinforcement rib 5 comprises a substantially horizontally extending base plate 14 on which vertically positioned wall sections 15a, 15b are formed. According to the first embodiment illustrated in the FIGS. 1 to 3, the reinforcement rib 5 is a forging or metal stamping part with comparatively sharp-edged transitions between the base plate 14 and the wall sections 15a, 15b.

Figure 2:
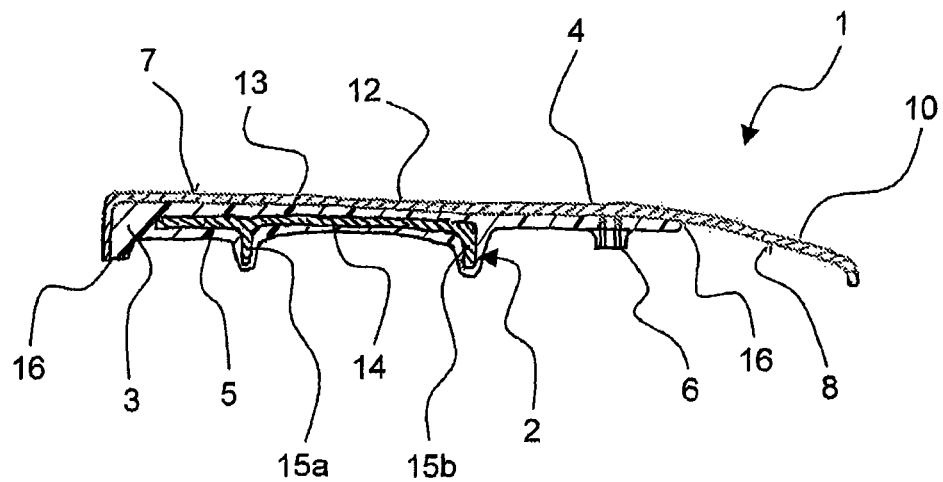
FIG. 2 shows a cross-section along the sectional plane A-A in FIG. 1.

As is particularly well illustrated in FIG. 2, the reinforcement rib 5 is glued by means of a bulk plastic material 3 underneath the coupling plate 4. Here, the coupling plate 4 is continuously filled up to its edge region 16 with the bulk plastic material 3. Also arranged between the coupling plate 4 and the reinforcement rib 5 is a sheet-like spacer horizon 13 made of the bulk plastic material 3. Furthermore, the shown first embodiment has a reinforcement rib 5 which is completely surrounded by the bulk plastic material 3.

In addition, the structural elements 2 comprise holders 6 which are stationarily fixed below the coupling plate 4. The holder 6 illustrated in FIG. 2 is a threaded insert part which is also inserted in the bulk plastic material 3 and is partially surrounded by the same.

Figure 3:
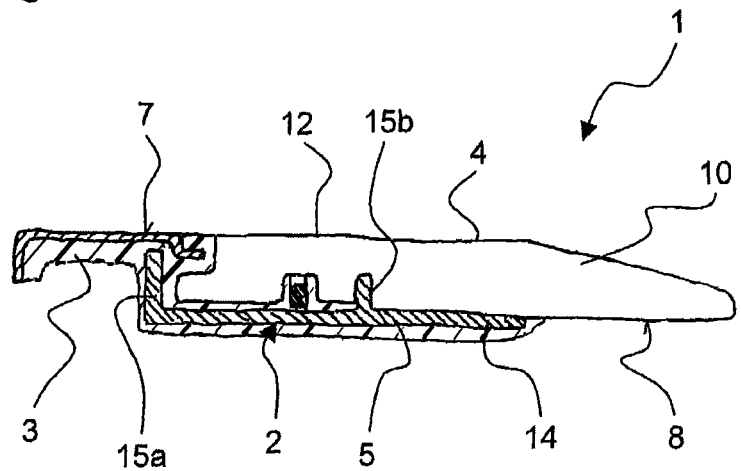
FIG. 3 shows a cross-section along the sectional plane B-B in FIG. 1.

FIG. 3 shows a cross-section through the closure area of the fifth wheel coupling, wherein the cut line in the assembled state of the coupling plate 4 corresponds to the longitudinal axis of the vehicle. In this area, between the upper side 7 of the coupling plate 4 and the reinforcement rib 5, a free installation space is provided which serves for inserting or fixing the king pin. Also in this area, the reinforcement rib 5 is completely surrounded by the bulk plastic material 3.

Figure 4:
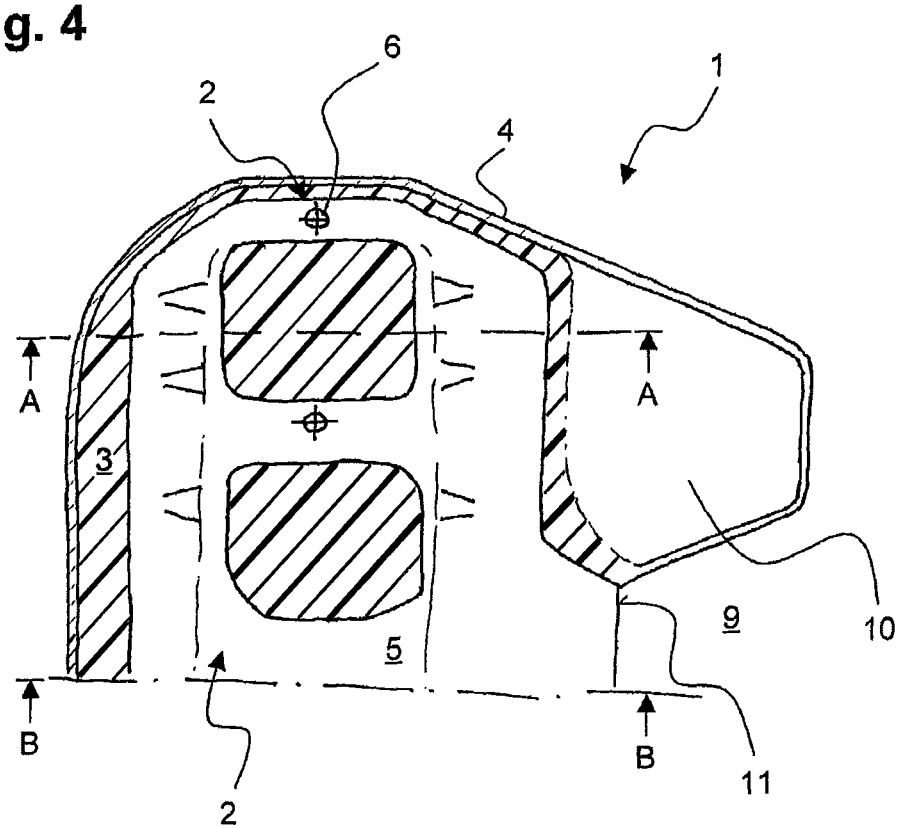
FIG. 4 shows a top view of a portion of a second embodiment in which a portion of a coupling plate is horizontally cut and removed so that a reinforcement rib and a bulk plastic material are visible.
Figure 5:
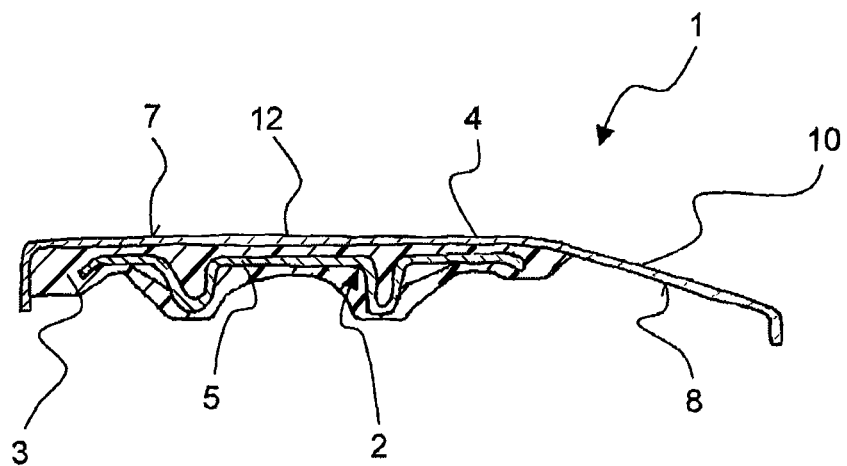
FIG. 5 shows a cross-section along the sectional plane A-A in FIG. 4.
Figure 6:
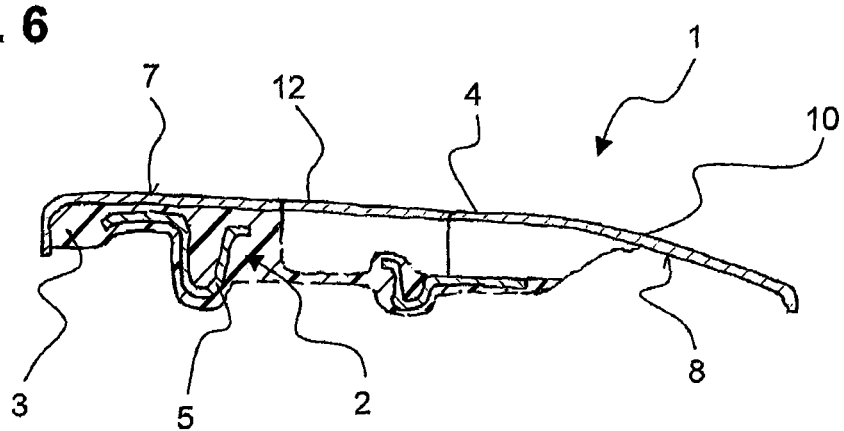
FIG. 6 shows a cross-section along the sectional plane B-B in FIG. 4.

FIG. 4 illustrates an alternative embodiment according to the invention in which the reinforcement rib 5 is manufactured as a pressed sheet metal part. Pressed sheet metal parts have comparatively round bending lines as is particularly well illustrated in the cross-sections of the FIGS. 5 and 6. The pressed sheet metal part used as reinforcement rib 5 is also completely glued into the bulk plastic material 3.

Figure 7:
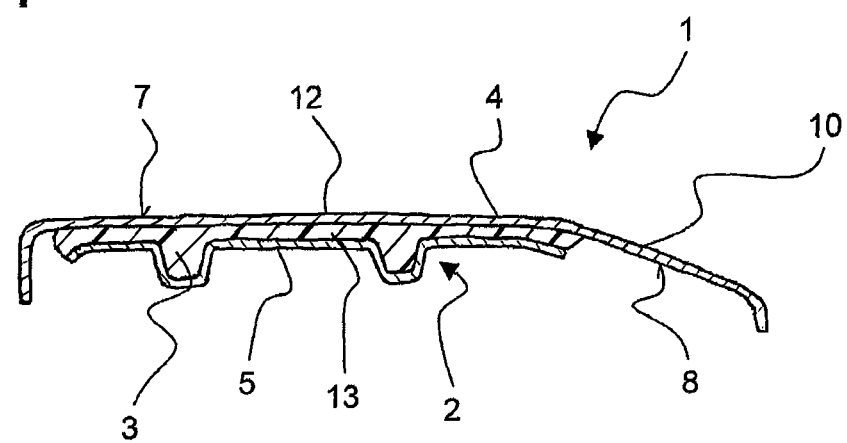
FIG. 7 shows a cross-section through a coupling plate according to a third embodiment.
Figure 8:
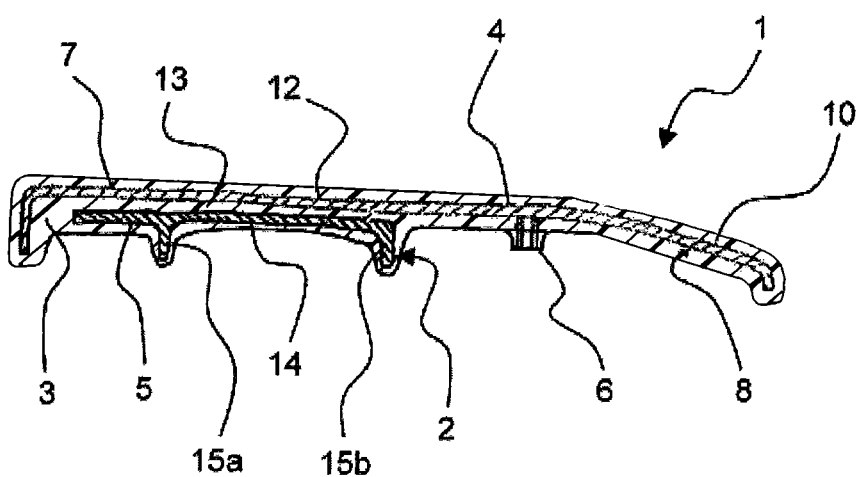
FIG. 8 shows a cross-section through a coupling plate according to a fourth embodiment in which a coupling body is completely enclosed by a bulk plastic material.
Figure 9:
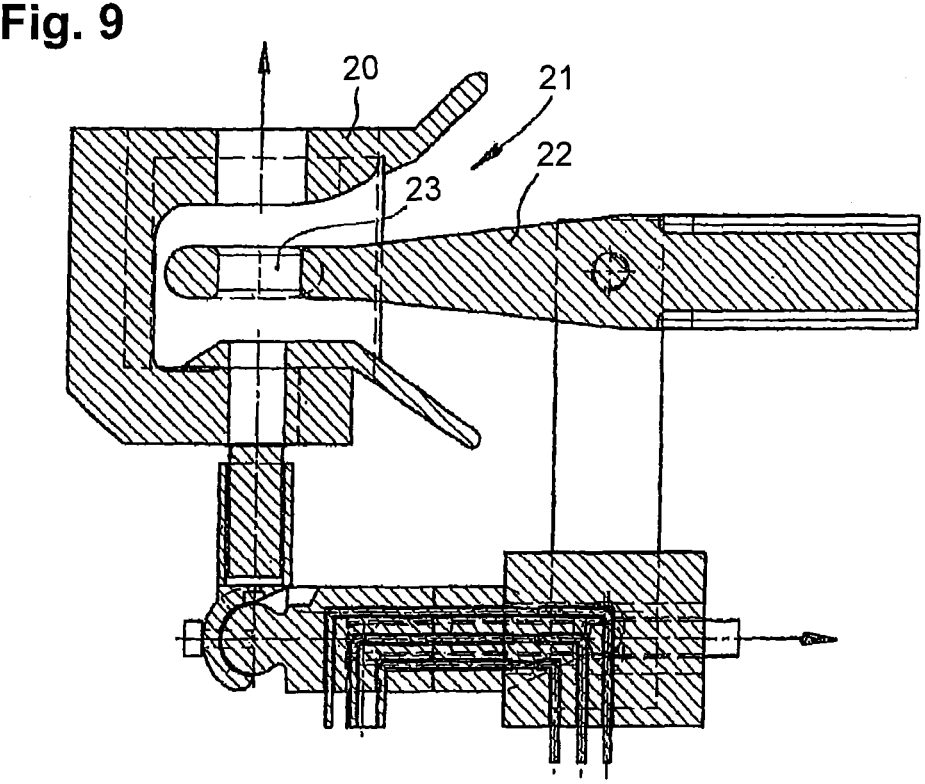
FIG. 9 shows a vertical cross-sectional view of one example of a conventional coupling jaw.

FIG. 7 shows a third embodiment in which the profiled reinforcement rib 5 is glued to the lower side 8 of the coupling plate 4 only via the spacer horizon 13. Provided that the reinforcement rib 5 is made of metal, conventional metal working methods can be used in further manufacturing steps on the lower side of the reinforcement rib 5.

REFERENCE NUMBER LIST

1 Coupling body
2 Structural element
3 Bulk plastic material
4 Coupling plate
5 Reinforcement rib
6 Holder
7 Upper side of coupling plate
8 Lower side of coupling plate
9 Insertion opening
10 Coupling horn
11 Rear side
12 Bearing area
13 Spacer horizon
14 Base plate 15a,b Wall section
16 Edge region of coupling plate

The invention claimed is:
1. A vehicle coupling comprising
a coupling body (1) formed by a coupling plate (4) of a fifth wheel coupling made of metal and having a rear insertion opening (9) for inserting a vertical king-pin and a closure area for holding the king-pin, the insertion opening (9) being bordered bilaterally by two coupling horns (10) of the coupling plate (4), the coupling plate (4) configured to have an installed position on a vehicle, in which the coupling plate forms a top surface of the coupling body, and
at least one structural element (2) arranged under the coupling plate (4) in the installed position, the at least one structural element being at least one stiffening reinforcement rib (5) including a horizontally extending base plate (14), on which vertically positioned wall sections (15a, 15b) are formed, wherein the horizontally extending base plate (14) is formed on opposing lateral sides of the closure area and runs underneath the closure area, and wherein the at least one stiffening reinforcement rib is glued to the coupling plate (4) by a bulk plastic material (3) interposed between the at least one structural element and the coupling plate, the at least one structural element being at least partially encapsulated in the bulk plastic material;
wherein the coupling body has a central longitudinal axis coinciding with a longitudinal vehicle direction, wherein the vertically positioned wall sections include a first vertically positioned wall section extending in front of the insertion opening (9) with respect to the longitudinal vehicle direction, and a second vertically positioned wall section extending into the insertion opening (9); and
wherein each of the vertically positioned wall sections (15a, 15b) extend transverse to the longitudinal vehicle direction from one of the opposing lateral sides of the closure area to the other one of the opposing lateral sides of the closure area.

2. The vehicle coupling according to claim 1, wherein the at least one structural element (2) comprises a plurality of reinforcement ribs (5).
3. The vehicle coupling according to claim 1, wherein the at least one structural element (2) is made of at least one of metal, carbon fiber, and fiber glass.
4. The vehicle coupling according to claim 1, wherein the at least one structural element (2) is made of a metal foam.
5. The vehicle coupling according to claim 1, wherein the at least one structural element (2) is in contact with the bulk plastic material (3) with at least one upper side.
6. The vehicle coupling according to claim 1, wherein the bulk plastic material (3) is fiber-reinforced.
7. The vehicle coupling according to claim 1, wherein the bulk plastic material (3) is a thermoplastic or a thermosetting plastic.
8. The vehicle coupling according to claim 1, wherein the bulk plastic material (3) is a plastic foam.
9. The vehicle coupling according to claim 1, wherein the bulk plastic material (3) is a foam containing metal.
10. The vehicle coupling according to claim 1, wherein the bulk plastic material (3) is arranged entirely below the top surface.
11. The vehicle coupling according to claim 1, wherein the at least one structural element has at least one holder including a threaded insert part, wherein the at least one holder is glued to the coupling body (1) via the bulk plastic material (3) and is inserted into and partially surrounded by the bulk plastic material.
12. The vehicle coupling according to claim 1, wherein the at least one structural element has at least two bearing points arranged in opposite lateral positions of the coupling body, wherein the bearing points are glued to the coupling body (1) via the bulk plastic material (3).
13. The vehicle coupling of claim 1, wherein in the installed position, the bulk material forms a bottom outer surface of at least portions of the vehicle coupling.
14. The vehicle coupling according to claim 1, wherein the at least one structural element is completely encapsulated in the bulk plastic material.

* * * * *